United States Patent
Stadler

(10) Patent No.: US 7,638,051 B2
(45) Date of Patent: Dec. 29, 2009

(54) FILTER APPARATUS

(75) Inventor: Bernhard Stadler, Freystadt-Burggriesbach (DE)

(73) Assignee: Hans Huber AG Maschinen-und Anlagenbau, Berching (DE)

( * ) Notice: Subject to any disclaimer, the term of this patent is extended or adjusted under 35 U.S.C. 154(b) by 443 days.

(21) Appl. No.: 11/546,936

(22) Filed: Oct. 12, 2006

(65) Prior Publication Data

US 2007/0084783 A1  Apr. 19, 2007

(30) Foreign Application Priority Data

Oct. 14, 2005 (DE) ........................ 10 2005 049 737
Nov. 25, 2005 (DE) ........................ 10 2005 056 586

(51) Int. Cl.
*B01D 33/00* (2006.01)
*B01D 33/50* (2006.01)
*B01D 33/35* (2006.01)
*B01D 35/00* (2006.01)

(52) U.S. Cl. ................. 210/380.1; 210/380.3; 210/398; 210/330; 210/331; 210/93

(58) Field of Classification Search ........................ None
See application file for complete search history.

(56) References Cited

U.S. PATENT DOCUMENTS

| 3,245,536 A | 4/1966 | McKay |
| 3,512,647 A * | 5/1970 | Young ................... 210/167.14 |
| 3,648,840 A * | 3/1972 | Bobo ........................... 494/56 |
| 5,630,938 A * | 5/1997 | Feller et al. .................. 210/350 |
| 5,679,249 A * | 10/1997 | Fendya et al. .......... 210/321.63 |
| 6,117,322 A | 9/2000 | Miller et al. |
| 7,037,427 B2 * | 5/2006 | Harms et al. ................. 210/331 |
| 2006/0060521 A1 * | 3/2006 | Harms et al. ................. 210/330 |

FOREIGN PATENT DOCUMENTS

| WO | 99 46025 | 9/1999 |
| WO | WO 2004/056446 | * 11/2001 |
| WO | WO 01/80971 | * 8/2004 |

OTHER PUBLICATIONS

EPO Search Report, Feb. 5, 2007.
German Patent Office Search Report, May 16, 2006.

* cited by examiner

*Primary Examiner*—Krishnan S Menon
*Assistant Examiner*—Benjamin Kurtz
(74) *Attorney, Agent, or Firm*—Dority & Manning, P.A.

(57) ABSTRACT

A filter apparatus in a container containing non-clarified contaminated liquid, especially wastewater, for clarifying this liquid consists of several spaced filter elements arranged in a circle or a polygon on a rotatably supported hollow shaft. The filter elements are connected to the hollow shaft in order to remove clarified liquid as permeate through the hollow shaft out of the container via a stationary pipeline. The rotating hollow shaft separates the wastewater from the permeate via at least two sealing elements. A blocking medium is arranged between the sealing elements.

15 Claims, 3 Drawing Sheets

FILTER APPARATUS

FIELD OF THE INVENTION

The present invention relates to a filter apparatus in a container containing non-clarified contaminated liquid, especially wastewater, for clarifying this liquid, consisting of several spaced filter elements arranged in a circle or a polygon on a rotatably supported hollow shaft, which filter elements are connected to the hollow shaft in order to remove clarified liquid that permeates through the hollow shaft out of the container via a stationary pipeline.

BACKGROUND

A generic filter apparatus is known, e.g., from WO 01/80971 A1. Non-clarified liquid is present in a container and is clarified by filter elements of a filter apparatus. The clarified liquid is supplied as permeate via a conduit system of a hollow shaft. The transfer of the permeate from the hollow shaft into a stationary pipeline by which the permeate is transported out of the container takes place in a swivel joint bearing that is supposed to seal the permeate line relative to the non-clarified liquid. This has the disadvantage that when the seals fail, non-clarified liquid can pass into the permeate and thus the already clarified liquid is contaminated again. This results in significant adverse effects on the purification of the wastewater.

The present invention ensures that the penetration of wastewater into the permeate is reliably prevented.

SUMMARY

Objects and advantages of the invention are set forth in part in the following description, or may be obvious from the description, or may be learned through practice of the invention.

In a particular embodiment, a rotating hollow shaft separates the wastewater from the permeate via at least two seals, with a medium arranged between the seals for separating non-clarified, e.g., wastewater, and clarified liquid, e.g., permeate. If one of the seals fails, the two liquids nevertheless do not come in contact with one another and it is ensured that in any case the wastewater cannot pass into the permeate line. As a result, the liquid facing the damaged seal passes first into the medium. The volume of this so-called blocking medium is advantageously sufficiently large that a sufficiently long reaction time remains for removing the liquid from the blocking medium before the two liquids would combine in the permeate line. The leaky liquid flows at first into the space of the medium and can be removed from it again without the permeate being contaminated.

If the blocking medium is liquid or gaseous, e.g., air or water, a very simple yet effective separation of wastewater and permeate is possible. The water must not be unpurified in order that if there is a penetration of this blocking medium into the permeate, the permeate is not contaminated by the blocking liquid.

The blocking medium may have an overpressure relative to the wastewater or the permeate such that, if there is a leak, the blocking medium will flow in the direction of the wastewater or of the permeate. This brings about an additional separating function between wastewater and permeate.

A sealed drain box may be arranged at the transitional point between the hollow shaft and the stationary pipeline, which box separates the clarified from the non-clarified liquid area. Thus, it is ensured, even if one of the seals fails, that the two liquid currents do not come in contact with one another but rather the liquid penetrates at first into the drain box and continues to remain separated from the other liquid. Enough time remains for repair measures without the purified water becoming contaminated in the meantime. This creates a reliable connection between the rotating filter apparatus and a stationary pipeline that also makes it possible that a leak can be detected very early, that is, especially before the liquids mix in the permeate current.

The permeate, that is removed out of the container through the hollow shaft, can be separated in an especially reliable manner from the wastewater if the hollow shaft has an axial opening. The axial opening serves to remove the permeate from the container with the non-clarified liquid. In contrast to the state of the art, in which the permeate is removed via a suction conduit arranged radially on the hollow shaft, in the case of an axial opening of the hollow shaft, the sealing can be carried out in a significantly more reliable manner. The construction can be designed in such a manner that even given a failure of individual sealing elements, it is still ensured that no wastewater penetrates into the permeate. The axial opening makes possible a large-area intersection between the rotating hollow shaft and a stationary connection position for removing the permeate from the container. In addition, a tolerance compensation that is very simple to carry out is possible in such a construction and additionally makes possible a reliable seal against the non-clarified liquid. However, according to aspects of the invention, a radial removal of the permeate from the hollow shaft is of course not excluded if a leak does not conduct the exiting liquid into the permeate, but rather at first into the drain box.

It is especially advantageous if the hollow shaft empties into a stationary connection piece, e.g., a flange or connecting piece in the wall of the container. This makes the assembly of the intersection between the rotating hollow shaft and the stationary connection piece possible in an especially simple manner since the connection piece and the hollow shaft can be coordinated in their length with one another in a simple manner.

Arranging a wear sleeve between the hollow shaft and the sealing elements avoids having to replace the complete hollow shaft for the connection piece after a rather long operating time. It is sufficient to only replace the wear sleeve, which is especially advantageous as regards the maintenance cost and maintenance time.

In order to obtain an especially good seal between the hollow shaft and the connection piece, the two components are rotatably connected to one another by a radial and/or axial seal. To this end, e.g., the hollow shaft is inserted into the connection piece, in which instance the hollow shaft has a smaller outside diameter than the inside diameter of the connection piece. The radial seal is arranged between outside diameter of the hollow shaft and the inside diameter of the connection piece. It compensates alignment errors and manufacturing tolerances without the permeate being able to exit from the flow-off line or non-clarified liquid being able to penetrate into the flow-off line.

It is especially advantageous if the hollow shaft is supported in a support unit with a roller bearing and/or friction bearing. This support unit can be sealed very simply with radial and/or axial sealing elements, e.g., sealing rings against the clarified and non-clarified liquid. It is especially advantageous if at least one, advantageously several, sealing rings against the clarified as well as against the non-clarified liquid are provided. This achieves a very reliable seal that also continues to ensure a sufficient seal if a single sealing ring fails.

The sealing of the support unit with sealing rings advantageously makes it possible that the support unit in the drain box is arranged dry in the container. This brings about on the one hand that the support of the hollow shaft is operated in a defined environment without contamination and thus achieves an extremely long service life. On the other hand, the arrangement of the support unit in the drain box makes it possible that the drain box functions at the same time to separate the clarified and the non-clarified liquid areas. This creates a large area that serves on the one hand for support and on the other hand for sealing the hollow shaft and the permeate flow-off. The sealing is very reliably possible in this support area since sufficient construction room is present for bringing several seals in and thus ensuring a reliable seal of the permeate flow-off.

If the hollow shaft and the connection piece empty into one another within the drain box, an especially reliable seal would be brought about again since the drain box ensures, in addition to the arranged sealing rings, a separation of the clarified liquid from the non-clarified liquid. Even if the sealing rings are not effective, the clarified liquid and the non-clarified liquid do not come directly in contact with one another but rather run at first into the drain box. The liquid that exited can be removed by suction from the drain box, or it can at least be indicated by sensors that the sealing apparatus is defective and must be repaired.

It is provided for an especially good seal that a grease chamber or liquid chamber is arranged on at least one sealing element, especially between two sealing rings of a sealing element, for blocking off the drain box from the clarified and the non-clarified liquid. This achieves an additional sealing protection. The grease chamber or liquid chamber is customarily provided between two sealing rings. The particular liquid must therefore penetrate two sealing rings and the grease chamber or liquid chamber in order to be able to exit from the container or permeate flow-off. Even if this should actually happen, the two liquids do not yet come in contact with each other, but rather the particular liquid flows at first into the drain box. A contact of the two liquids, in particular a flowing in of the non-clarified liquid into the permeate flow-off, is thus excluded. In addition, the grease serves as a lubricating film between the sealing elements and the wear sleeves, which has a positive effect on the service life.

In order to detect a defective sealing location, it is advantageously provided that the grease chamber or liquid chamber is associated with a sensor for monitoring the amount and/or the pressure of the grease or of the liquid. As soon as the amount or the pressure of the grease or liquid is reduced, it can be deduced from this that the seal has a leak and that grease or liquid is exiting from the grease chamber or liquid chamber. A maintenance of the seal is then necessary.

It is especially advantageous if a sensor for determining the entrance of water into the drain box is arranged in the drain box. The drain box function as catch container for exiting liquid, that can be pumped off, for example, after being detected with the sensor. In addition, this can determine whether the seal is defective in an inadmissible manner and an appropriate maintenance can be initiated.

The filter apparatus is driven in an especially simple manner with a chain drive. The drive gear of the chain drive is arranged on the hollow shaft in the area of a friction bearing. The friction bearing takes up the occurring forces of the chain drive in an especially advantageous manner. Moreover, a friction bearing can be arranged in the wastewater liquid without a special seal. This makes possible a very simple and economical support of the hollow shaft and therewith of the filter apparatus in the container. Of course, the support with a roller bearing is also possible at this location.

As a result of the separation of the hollow shaft into two chambers that are separated from one another, a hollow shaft can be used both for removing the permeate and also for cleaning the filter elements. The one chamber of the hollow shaft serves to remove the permeate. A cleaning apparatus for cleaning the filter elements with the cleaning medium, e.g., with rinsing air or rinsing liquid, is arranged in the second chamber. The cleaning apparatus blows rinsing air or liquid into the second chamber of the hollow shaft. If openings are provided in the hollow shaft in the area of the second chamber, then the rinsing air or liquid exits out of the hollow shaft through the openings and brushes along the filter elements of to the surface of the non-clarified liquid. Deposits present on the filter elements are entrained by the rinsing air or liquid and thus clean the surface of the filter elements.

Is especially advantageous if a lance for introducing the rinsing air into the hollow shaft is provided as cleaning apparatus. The lance has openings from which the rinsing air can exit. It is customarily stationarily arranged in the hollow shaft but can also be designed, e.g., to move axially in order to bring about an especially good cleaning.

In order to also be able to free the lance from contaminants, the lance is advantageously associated with an apparatus for rinsing back. This apparatus, that is also arranged in the hollow shaft, makes it possible that instead of the rinsing air, a cleaning liquid is transported through the lance that removes contaminants in the lance. This cleaning liquid can be provided with chemical additives in order to achieve an especially thorough cleaning.

Other advantages of the invention are described in the following exemplary embodiments.

DESCRIPTION

Figure 1:
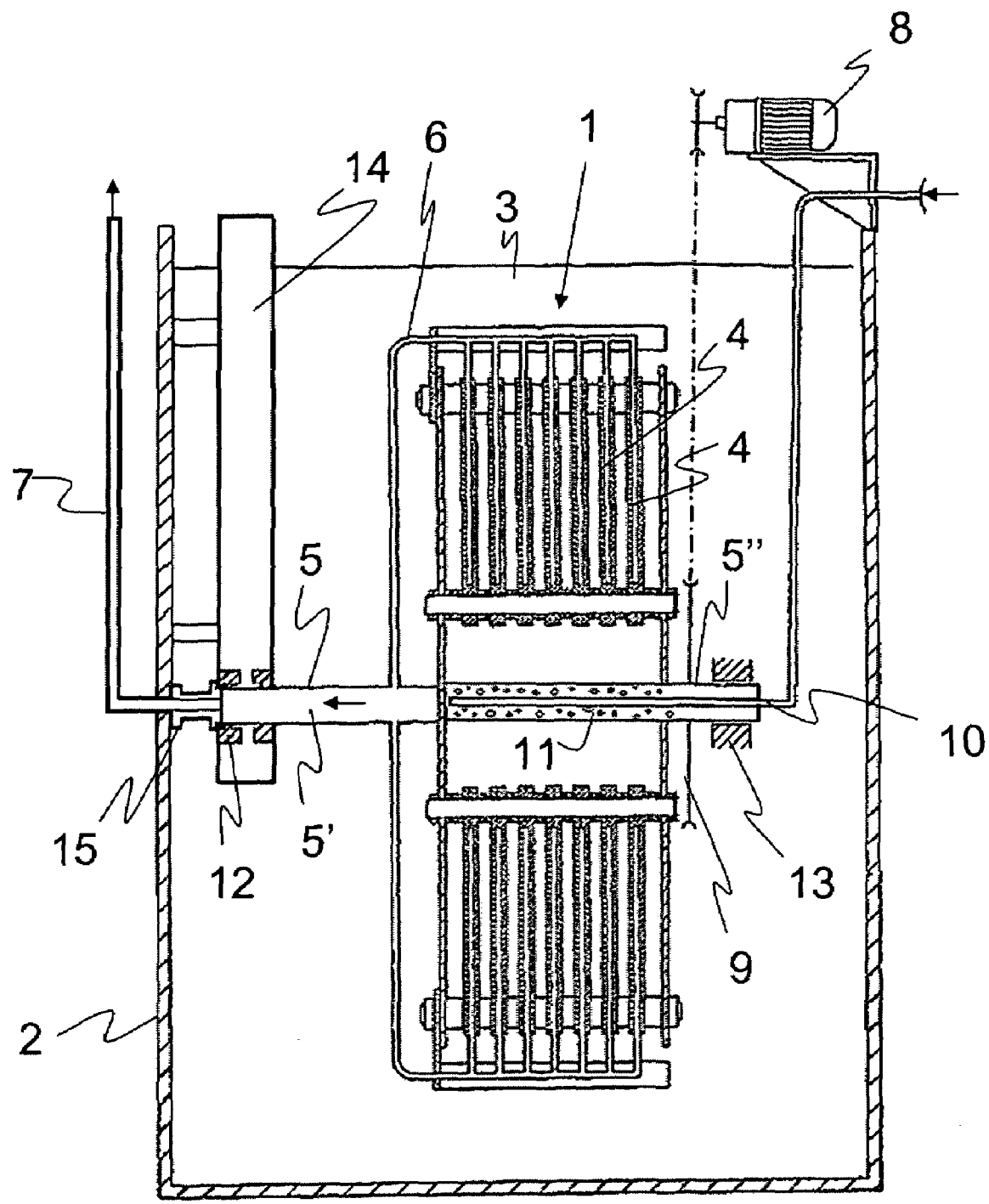
FIG. 1 shows a schematic view of a filter apparatus in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a filter apparatus 1 located in a container 2 with non-clarified liquid, especially wastewater 3. Filter apparatus 1 consists of several spaced filter elements 4 arranged in a circle or a polygon on rotatably supported hollow shaft 5. Wastewater 3 rests on the outside of filter elements 4 and is sucked through filter elements 4 into supply line 6. Supply line 6 empties into hollow shaft 5 and is transported from it into stationary pipeline 7 out of container 2.

Hollow shaft 5 is driven together with filter apparatus 1 by drive motor 8, in this example with a chain drive that acts on drive gear 9 of hollow shaft 5. Lance 10, via which a rinsing medium, e.g., rinsing air or rinsing liquid, is conducted into the interior of hollow shaft 5, empties into hollow shaft 5. Hollow shaft 5 is provided in the area of lance 10 with openings 11 through which the rinsing medium of lance 10 exits out of hollow shaft 5 and escapes upward along filter elements 4 from wastewater 3, during which the rinsing medium brushes off contaminants that had settled on filter elements 4, thereby cleaning filter elements 4.

Hollow shaft 5 is rotatably mounted at its two ends with the bearings 12 and 13. Bearing 13 is located in wastewater 3 and is therefore designed as a friction bearing. Of course, the use of a roller bearing at this location is also possible in another embodiment. Bearing 12 is designed as a roller bearing and is located in the preferably dry area. Bearing 12 is built into drain box 14 and supports hollow shaft 5 at the transition to flange 15 that establishes the connection to pipeline 7. Flange 15 is permanently connected to container 2 and to stationary pipeline 7 and drain box 14 so that the entrance of wastewater into drain box 14 is not possible from this side. For its part, hollow shaft 15 is sealed against drain box 14 in such a manner that the entrance of purified liquid into drain box 14 is prevented in the same manner as the entrance of wastewater 3 into drain box 14.

Furthermore, FIG. 1 shows that hollow shaft 5 is subdivided into two chambers 5' and 5". The clarified liquid is transported out of container 2 in chamber 5' whereas chamber 5" has openings 11 through which the rinsing air supplied from lance 10 to filter apparatus 1 can escape. The two chambers 5', 5" are not connected to one another.

Figure 2:
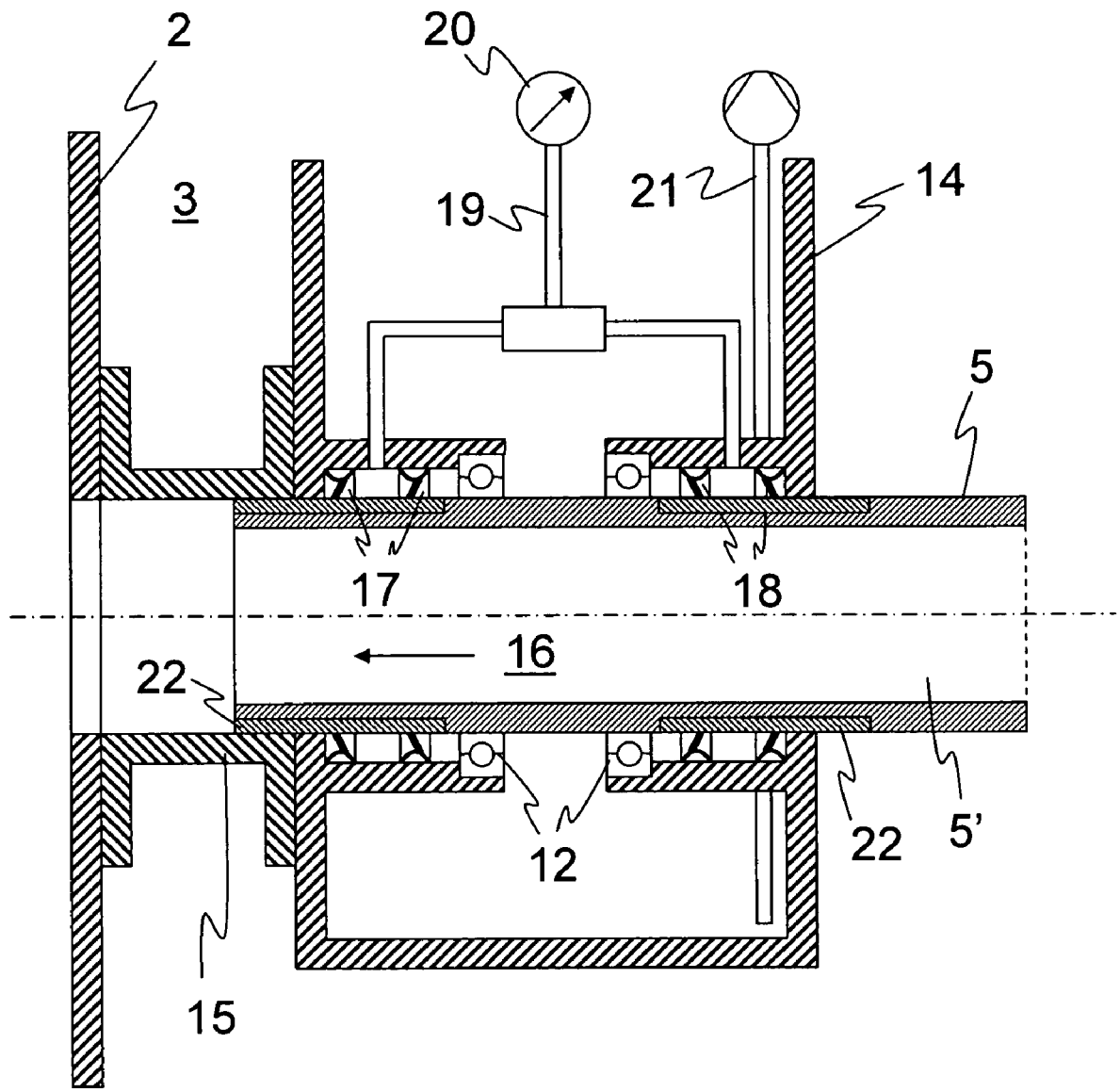
FIG. 2 shows a schematic view of the support of the hollow shaft in the area of the transitional area between the hollow shaft and the stationary pipeline.

FIG. 2 schematically shows the support of hollow shaft 5 in drain box 14 and the connection to flange 15 and the wall of container 2. Hollow shaft 5 is located with its end in flange 15 and thus creates a connection for transporting the clarified liquid out of container 2. In order to obtain a seal and thus a separation of clarified liquid 16 from wastewater 3, hollow shaft 5 is sealed inside drain box 14 against wastewater 3 and also against clarified liquid 16 by sealing elements 17, 18. Sealing elements 17 rest on the end of hollow shaft 5 and bring about a seal of clarified liquid 16 against drain box 14. Sealing elements 18 spaced further from the end of hollow shaft 5 bring about a seal of wastewater 3 relative to drain box 14.

Sealing elements 17 as well as sealing elements 18 consist of at least two seals arranged spaced apart from each other. A chamber is present between the particular seal rings into which chamber grease is pressed in through line 19. It is also alternatively possible to press in liquid or air in order to reinforce and/or check the sealing action of sealing elements 17, 18. Furthermore, line 19 is associated with measuring apparatus 20 by which it can be determined whether there is a consumption of grease or liquid. If this is the case, it can be concluded that at least one of the sealing elements is defective and appropriate measures against this can be taken.

A significant advantage of the arrangement of sealing elements 17, 18 relative to hollow shaft 5 and drain box 14 is that the clarified liquid 16 and wastewater 3 are separated from one another by sealing elements as well as by drain box 14. Even in the case of a failure of one or even both sealing elements 17, 18 there is no immediate danger that wastewater 3 can pass into the line for clarified liquid 16 and that clarified liquid 16 would be contaminated in this manner. This could only happen when drain box 14 is filled up to the level of the sealing elements. In order to prevent this, it can furthermore be provided that suction removal apparatus 21 is arranged in drain box 14. As soon as exited liquid is present in drain box 14 it is removed from drain box 14 via suction removal apparatus 21 and returned to wastewater 3.

The end of hollow shaft 5 is provided with wear sleeve 22. Wear sleeve 22 is arranged in the area of sealing elements 17, 18. It can be replaced as needed without having to remove filter apparatus 1 from container 2. This makes an especially economical maintenance of the system possible.

Figure 3:
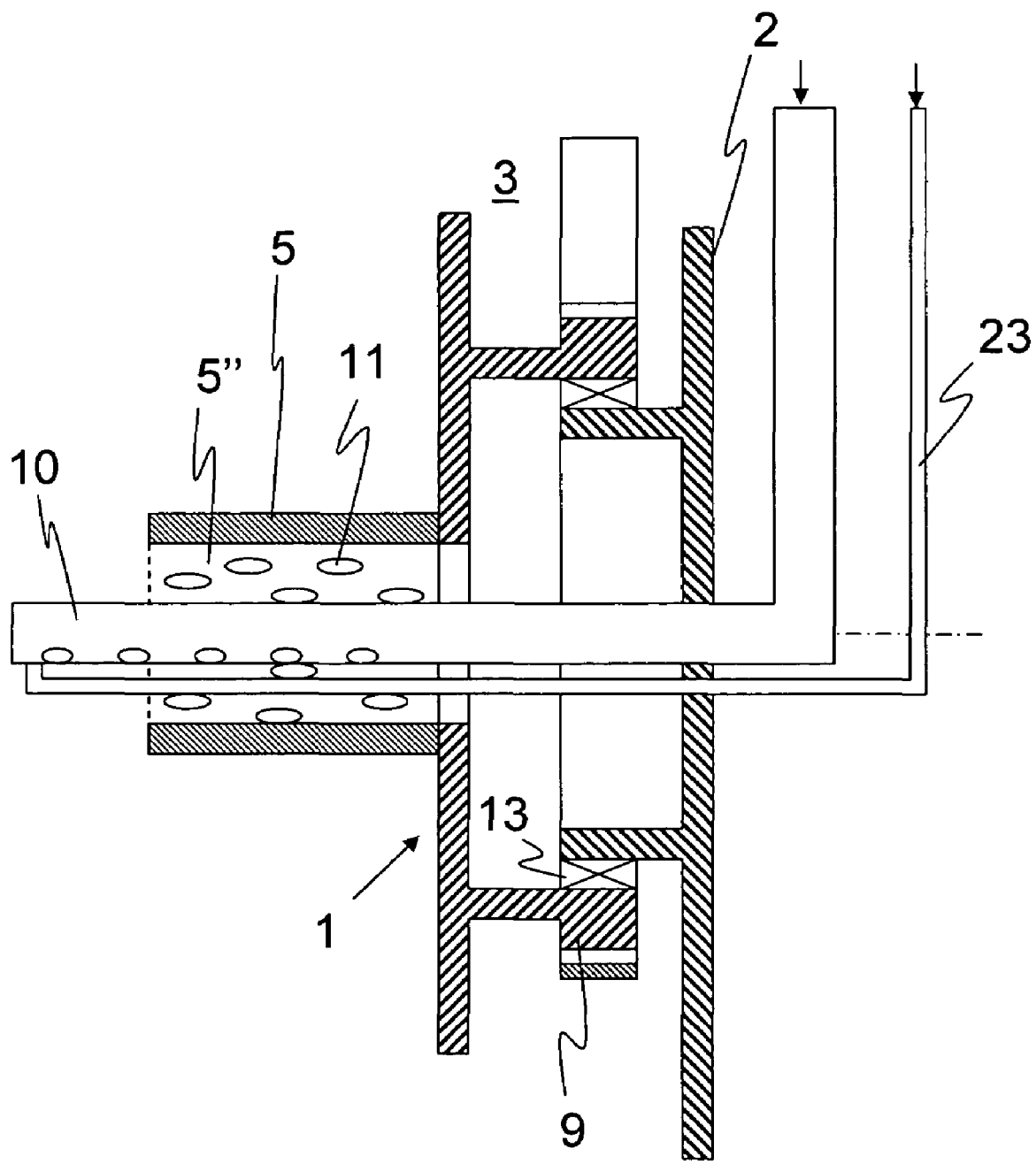
FIG. 3 shows a schematic view of the drive and of the support of the hollow shaft at the end facing away from the transitional area.

FIG. 3 shows a schematic view of the support of hollow shaft 5 in the area of the drive of hollow shaft 5. It is apparent from it that bearing 13 is in the area of wastewater 3. Bearing 13 is therefore preferably constructed as a friction bearing. Drive gear 9 acts directly on filter apparatus 1, that is fastened to hollow shaft 5. It is driven by motor 8 (FIG. 1) by a chain or belt.

Lance 10, that is designed to be stationary, extends into hollow shaft 5 and its chamber 5". Rinsing line 23 is provided at the end of lance 10. Rinsing liquid can be conducted through rinsing line 23 via lance 10 counter to the direction of flow of the rinsing air. This makes a cleaning of lance 10 possible in a very simple manner.

The present invention is not limited to the exemplary embodiments shown. The concept "container" used in the Application also includes, of course, a basin or a pan. Also, instead of the radial sealing elements shown, axial sealing elements can be used in an appropriate construction. In particular, modifications and variations to the embodiments described or illustrated are possible within the scope of the invention.

The invention claimed is:

1. A filter apparatus for clarifying contaminated liquid in a container, said filter apparatus comprising:
   a plurality of spaced filter elements arranged on a rotatably supported hollow shaft, said filter elements in fluid communication with said hollow shaft such that contaminated liquid that passes through said filter elements becomes clarified liquid conveyed by said hollow shaft;
   a stationary pipeline in fluid communication with said hollow shaft for conveying the clarified liquid out of the container;
   at least two spaced apart sealing elements disposed at different locations relative to said hollow shaft, each of said sealing elements comprising at least two seal members separated by a chamber, with a medium contained within said chamber;
   wherein said sealing elements are disposed such that failure of any one of said sealing elements does not result in contamination of the clarified liquid by contaminated liquid from the container;
   wherein said filter apparatus is disposed within a container, and further comprising a stationary connection piece between said hollow shaft and said pipeline through which clarified liquid from said hollow shaft is conveyed to said pipeline, said connection piece disposed in a wall of said container, said hollow shaft rotatable relative to said connection piece; and
   further comprising a drain box disposed within said container, said hollow shaft disposed through said drain box, said stationary connection piece disposed between said drain box and said container wall.

2. The filter apparatus as in claim 1, wherein said medium is a liquid or gaseous medium.

3. The filter apparatus as in claim 1, further comprising a sensor configured to detect leakage of contaminated or clarified liquid into said drain box.

4. The filter apparatus as in claim 1, wherein said hollow shaft comprises an axial opening through which clarified liquid passes to said pipeline.

5. The filter apparatus as in claim 1, wherein said hollow shaft is rotatably supported by at least one bearing unit that is isolated from contact with contaminated or clarified liquid by said sealing elements.

6. The filter apparatus as in claim 5, wherein said bearing unit is contained within said drain box, said drain box sealed by said sealing elements.

7. The filter apparatus as in claim 1, wherein said seal members comprise sealing rings, said chamber comprising a grease or liquid medium.

8. The filter apparatus as in claim 1, further comprising a wear sleeve disposed between said hollow shaft and said sealing elements, said medium serving to lubricate said wear sleeves.

9. The filter apparatus as in claim 1, wherein said medium is pressurized.

10. The filter apparatus as in claim 9, further comprising a sensor configured to detect a decrease in pressure of said pressurized medium.

11. The filter apparatus as in claim 1, wherein said hollow shaft comprises two separate chambers, the clarified liquid conveyed through a first of said chambers, and a cleaning medium conveyed to and out of openings in the second of said chambers for cleaning said filter elements.

12. The filter apparatus as in claim 11, further comprising a lance configured to supply the cleaning medium to said second chamber.

13. The filter apparatus as in claim 12, further comprising a back rinsing unit configured to rinse said lance.

14. A filter apparatus for clarifying contaminated liquid in a container, said filter apparatus comprising:
   a plurality of spaced filter elements arranged on a rotatably supported hollow shaft, said filter elements in fluid communication with said hollow shaft such that contaminated liquid that passes through said filter elements becomes clarified liquid conveyed by said hollow shaft;
   a stationary pipeline in fluid communication with said hollow shaft for conveying the clarified liquid out of the container;
   at least two spaced apart sealing elements disposed at different locations relative to said hollow shaft, each of said sealing elements comprising at least two seal members separated by a chamber, with a medium contained within said chamber;
   wherein said sealing elements are disposed such that failure of any one of said sealing elements does not result in contamination of the clarified liquid by contaminated liquid from the container;
   further comprising a lance configured to supply a cleaning medium to said hollow shaft; and
   further comprising a back rinsing unit configured to rinse said lance.

15. The filter apparatus as in claim 1, wherein said sealing elements are disposed within said drain box such that any leakage of contaminated or clarified liquid through said sealing elements collects in said drain box.

* * * * *